US 6,595,085 B1

(12) United States Patent  
Osenbaugh

(10) Patent No.: US 6,595,085 B1  
(45) Date of Patent: Jul. 22, 2003

(54) DIFFERENTIAL BEARING CAP

(75) Inventor: Brent K. Osenbaugh, Auburn, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/323,812

(22) Filed: Jun. 2, 1999

(51) Int. Cl.⁷ .............................................. F16H 57/02
(52) U.S. Cl. ........................................ 74/607; 384/434
(58) Field of Search .............................. 74/606 R, 607; 475/230; 384/434

(56) References Cited

U.S. PATENT DOCUMENTS

| 1,973,905 A | * | 9/1934 | Leach ........................... 74/607 |
| 2,132,816 A |   | 10/1938 | Wollner |
| 2,273,920 A |   | 2/1942 | Anderson |
| 2,291,436 A |   | 7/1942 | Anderson |
| 2,299,001 A |   | 10/1942 | Anderson |
| 2,336,579 A |   | 12/1943 | Venditty et al. |
| 2,529,392 A | * | 11/1950 | Herreshoff ................ 74/606 R |
| 5,234,271 A | * | 8/1993 | Lindstrom ................... 384/434 |
| 5,271,294 A | * | 12/1993 | Osenbaugh ................... 74/607 |
| 5,501,638 A |   | 3/1996 | Duggan |

* cited by examiner

Primary Examiner—Dirk Wright  
(74) Attorney, Agent, or Firm—Hahn Loeser & Parks LLP

(57) ABSTRACT

A differential axle assembly including a differential carrier rotably supported on bearings within a differential carrier. Each bearing has a standardized outside diameter, and is held in place in the carrier with a bearing cap. The bearings are secured within the differential carrier in semi cylindrical bearing recesses that are machined independently from the bearing caps. The bearing caps are each formed with a bearing recess substantially equal in size to the machined bearing recess in the differential carrier. The bearing caps are formed to a finished size prior to installation on the differential carrier. The finished dimensions of the bearing cap are of a predetermined standard size to allow placement of the bearing cap indifferent to orientation on the differential carrier. When fastened together, the machined bearing recess in the carrier and the corresponding bearing recess in the bearing cap form a bore of a standard size slightly smaller than the outside diameter of the bearing causing a preload on the bearing to prevent rotation of the outer race, so that the bearings and the rotably supported case may be secured therein.

9 Claims, 2 Drawing Sheets

DIFFERENTIAL BEARING CAP

The present invention relates generally to a differential carrier bearing cap. More specifically, the present invention relates to a differential carrier side bearing retaining cap that is universal in construction and application.

BACKGROUND OF THE INVENTION

Differential axle assemblies are well known structures that are commonly used in vehicles. Differentials contain many parts to transfer the rotational force produced by the engine to the drive wheels. The typical differential is made up of a centralized carrier/housing assembly, to which axle tubes are directly or indirectly attached. The gears are housed in a portion of the differential housing called the differential carrier. Two main configurations of differential axle assemblies exist. In one configuration referred to as the spicer type, the differential carrier is an integral part of the differential housing. A second configuration, commonly called the banjo or front loader type, a separate differential carrier section is affixed to the housing. Both types of axle assemblies use the differential carrier to house the differential case. The case is equipped with anti friction side bearings on opposed ends, and is rotably secured with these bearings in machined bores made within the carrier. The bores are cylindrical in shape having one half of the cylinder machined from the carrier housing, and the corresponding other half of the bore machined from a bearing cap. Because the current caps are not standardized, the bores must be finish machined with the caps bolted in place. This machining method requires the bearing caps be oriented in exactly the same manner during assembly that they were when they were machined. This orientation is necessary to create the required bore tolerances for proper carrier side bearing alignment and preload. The process is as follows: the rough caps must be bolted in place on the carrier; the bores machined from the caps and the carrier; the caps marked for orientation, unbolted and removed from the carrier; the gears and carrier assembled; the caps reinstalled in proper orientation and bolted in place.

While the above method of machining the rough non standardized bearing caps when they are bolted in place is standard practice in the current manufacture of differentials, there are certain drawbacks associated with the machining process and the finished product. For example, the current process is inefficient in that the caps must be assembled on the differential at least twice, once for machining the bore in the rough caps and once for final assembly of the differential. Machining the bore in this manner causes the placement of the bore within the cap and the carrier to vary. This variance requires that the caps be marked for orientation after the machining process, and that subsequent assembly adhere to this orientation to assure the bores are true with respect to roundness. The bearing caps must always be installed to duplicate the orientation in which they were machined, and upon disassembly for repair or service, the orientation of the bearing caps on the carrier must be noted so that proper reassembly can occur. Failure to reassemble the caps in the proper positions can result in misalignment of the side bearings on the case and possible destruction of the differential. Furthermore, any type of failure occurring with either non standard bearing cap may necessitate the replacement of the entire differential because a standard replacement having the exact bore placement is unavailable, and if a replacement cap is used, both the cap and carrier must be remachined as a set to assure roundness of the bore.

In light of the deficiencies in prior art, the applicants' invention is herein submitted.

SUMMARY OF THE INVENTION

The preferred embodiment of the invention discloses a differential axle assembly comprising a differential housing, a differential carrier, a differential case, bearings, bearing caps, and fasteners. A differential carrier is either integral to or attached to the differential housing. The differential carrier has a differential case therein. The differential case has a bearing disposed at each longitudinally opposed end. Each of the bearings rotably supports the differential case within the differential carrier. Each of the bearings has an outside diameter. A bearing cap retains each of the bearings in the differential carrier. The bearing cap comprises two upstanding opposed sidewall members. A web member extends therebetween. The web member has an arcuate midsection which forms a bearing recess on its inner surface. The recess corresponds with the outside diameter of the bearing. A flat retaining flange extends from either end of the web member. A retaining hole extends through each flange. The differential carrier has a machined bearing recess to receive a portion of the outside diameter of the bearing and a machined mating surface for attachment of the bearing cap. A fastener secures the bearing cap to the differential case through each retaining hole and a corresponding hole on the machined mating surface of the differential case.

The present invention provides the advantage of a differential bearing cap that is of a standard size and is formed separately from the differential carrier, so as to decrease the machining and assembly time, and to allow placement of the differential bearing cap onto the differential, indifferent to orientation.

DESCRIPTION OF A PREFERRED EMBODIMENT

Figure 1:
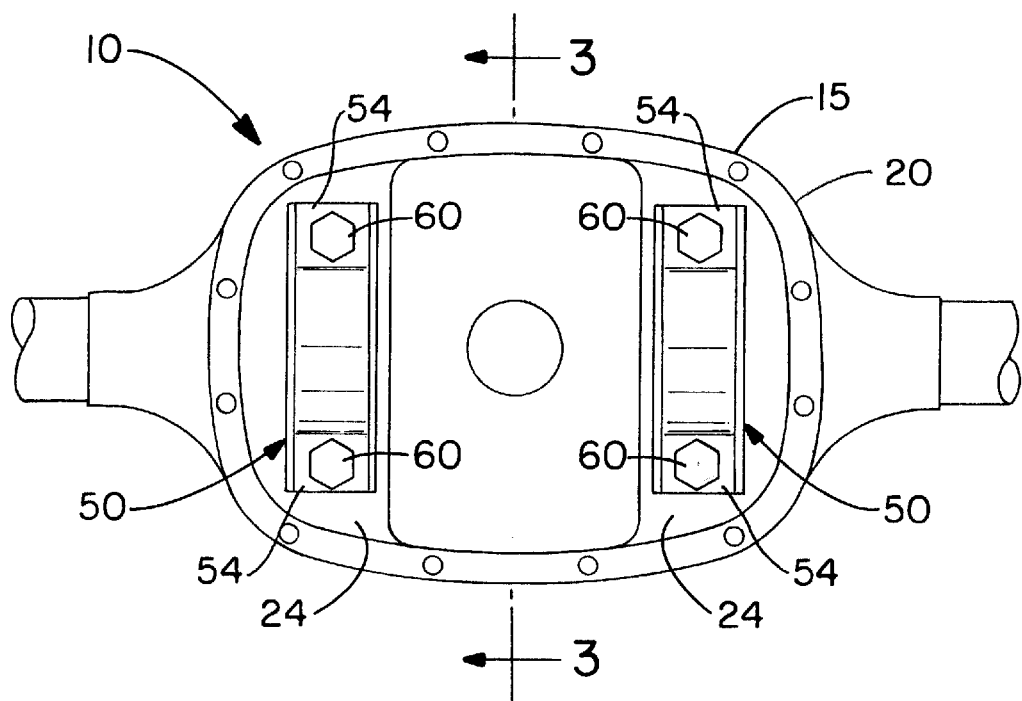
FIG. 1 is a elevational view of a differential axle assembly.

A differential bearing cap in accordance with the present invention is shown generally as 50 in the accompanying drawings. A spicer type differential axle assembly 10 having an integrated differential carrier 20 and housing 15 is depicted in the drawings. However, the differential bearing cap of the present invention would function in an identical manner if used with a differential having a non integral carrier assembly.

FIG. 1 shows the center portion of a differential axle assembly 10 including a housing 15 and an integral differential carrier 20. A pair of differential bearing caps 50 are fastened to the differential carrier 20 using fasteners 60. Bearing caps 50 are used to secure a differential case (not shown) within differential carrier 20.

Figure 2:
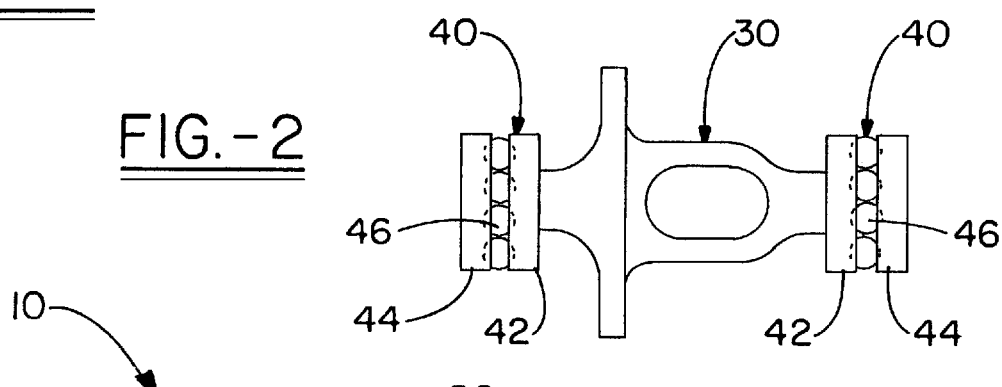
FIG. 2 is a rear elevational view of a differential case.

FIG. 2 shows a differential case 30 with bearings 40 disposed at each longitudinally opposed end. Bearings 40 are commonly called side bearings, and are typically of the common roller type having an inner race 42, an outer race 44, and rollers 46 of some configuration rotably retained therebetween. Bearings 40 typically are affixed to differential case 30 in a manner well known in the art, having the inner race 42 of the bearings 40 non rotably pressed into engagement with the opposed ends of differential case 30.

Figure 3:
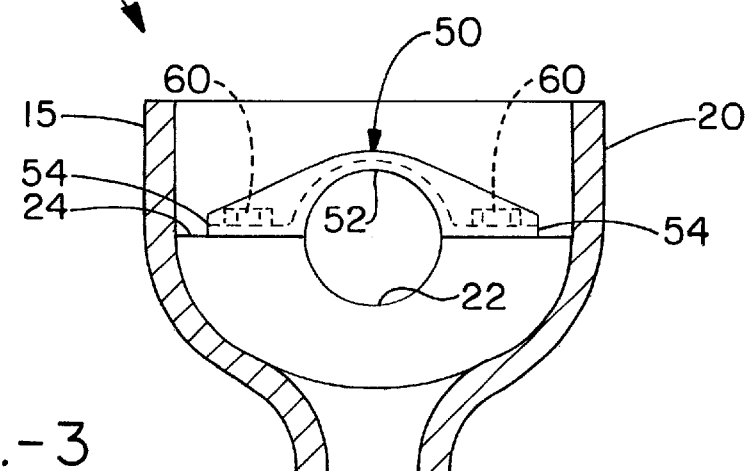
FIG. 3 is a cross sectional view taken along section line 3—3 of FIG. 1.

FIG. 3 is a cross sectional view taken across section line 3—3 of FIG. 1 showing differential housing 10 with differential carrier 20 having a preferred embodiment of the present invention installed thereon. Machined semi-cylindrical bearing recess 22 may be cut from differential carrier 20 using many methods to include plunge milling, wherein both sides of the differential are cut at the same time. Machined bearing recess 22 is cut in a semi cylindrical shape and to a standard size to receive one half of the circumferential periphery of the outer race 44 of bearing 40. Bearing recess 22 is cut independently of bearing cap 50. Bearing cap 50 is affixed to differential carrier 20 using flanges 54 that are secured to mating surfaces 24 with fasteners 60. When assembled, bearing recess 52 and machined bearing recess 22 form a cylindrical bore slightly smaller in size to the outside diameter of the outer race 44 of the bearing 40 such that the outer race 44 has sufficient preload, or bearing squeeze to prevent rotation. The cylindrical bore is of a standard size having both machined bearing recess 22 and bearing recess 52 formed independently of each other to predetermined dimensions approximating one half of the circumferential periphery of bearing 40.

When differential case 30 having bearings 40, as shown in FIG. 2 is installed into differential carrier 20, approximately one half of the periphery of bearings 40 are inserted into corresponding bearing recesses 22. Bearing caps 50 are then secured to differential case 20 with fasteners 60 holding each mating flange 54 in contact with machined mating surface 24. Bearing recess 52 and machined bearing recess 22 form a cylindrical bore that circumscribes and non rotably secures the outer race 44 of bearing 40. Differential case 30 is able to rotate within constrained bearings 40.

Figure 4:
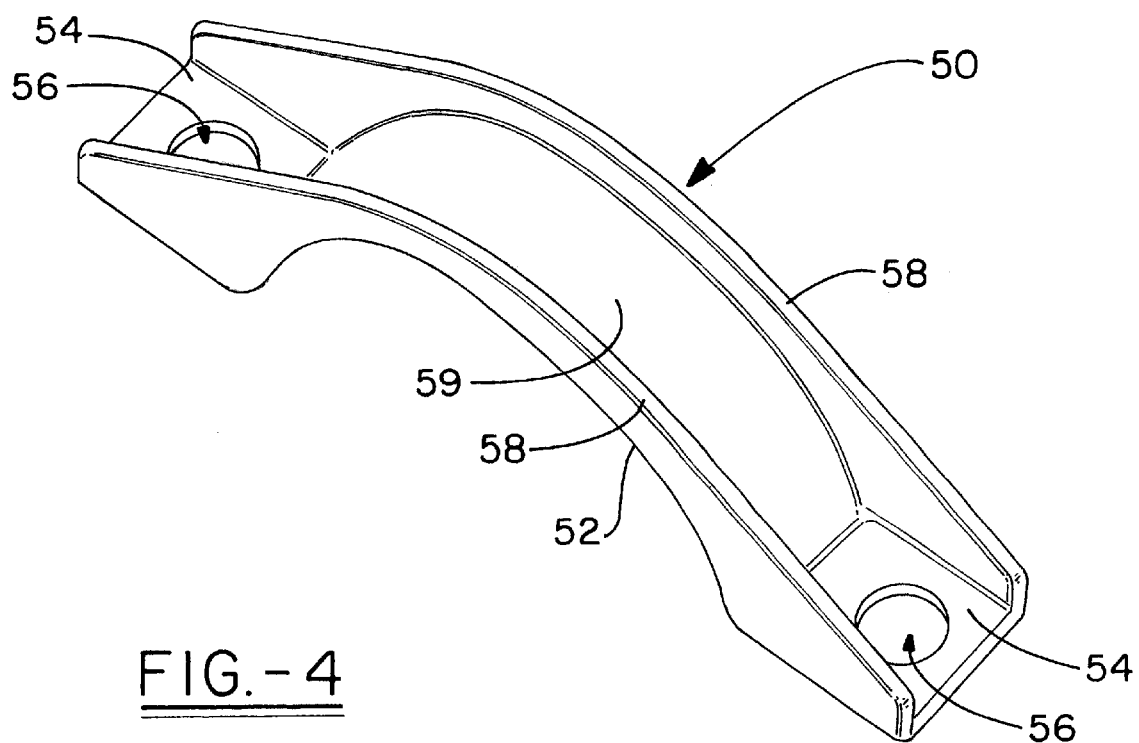
FIG. 4 is a perspective view of a differential bearing cap in accordance with the present invention.

FIG. 4 is a perspective view of a bearing cap 50 in accordance with the present invention. Bearing cap 50 may be made from any material and formed from any process that will result in a bearing cap with the required mechanical properties to perform at or above the design parameters of the particular application. Bearing cap 50 may be heat treated to impart the strength or ductility as required. In a preferred embodiment, bearing cap 50 is forged to final dimensions from an alloy of superior strength and lending itself to this forming process. Bearing cap 50 has upstanding opposed sidewalls 58 longitudinally extending its entire length. Sidewalls 58 are substantially parallel and increase the strength and rigidity of bearing cap 50. Web member 59 extends the longitudinal length of bearing cap 50, and spans between sidewalls 58. Web member 59 forms bearing recess 52 from its arcuate lower side and extends laterally at each end of bearing recess 52 to form mating flanges 54. A retaining hole 56 is disposed on each mating flange 54. A mechanical fastener 60, is placed through each retaining hole 56 to secure bearing cap 50 to the differential carrier 20. In a preferred embodiment, a bolt is used as fastener 60 and threadably engages a threaded hole in the machined mating surface 24 of differential carrier 20. Bearing cap 50 may be mass produced so that all the caps produced for a particular application are dimensionally equivalent.

Both machined bearing recess 22 and bearing recess 52 are formed independently of each other to a predetermined standard size, thus allowing bearing caps 50 to be installed disregarding orientation. Bearing caps 50 can be installed on differential carrier 20 without regard to orientation during the initial assembly of the differential and during any required repair or servicing. Bearing cap 50 is mass produced to dimensions that are standard for the intended application, so that any of the bearing caps produced for the same application are dimensional equivalents and can be installed with the same fit and function. Therefore a differential with a damaged bearing cap can easily be repaired by installing a replacement bearing cap that is dimensionally equivalent to the damaged original. This enables replacement of the damaged bearing cap without requiring additional fitting or machining.

The foregoing description has set forth a preferred embodiment of the present invention. It is to be understood that numerous modifications, substitutions and changes can be undertaken without departing from the spirit and scope of the present invention.

What is claimed is:

1. A method for manufacturing a differential carrier of a differential axle assembly comprising the steps of:

a) machining at least two semi-cylindrical bearing recesses in said differential carrier; wherein each of said recesses is machined to a standard size to receive half of the circumferential periphery of an outside diameter of a bearing assembly attached to opposite sides of a differential case;

b) forging at least two bearing caps, each having a semi-cylindrical bearing recess wherein said semi-cylindrical bearing recess is formed during said forging process to its finished dimensions which is of a predetermined standard size slightly smaller than the corresponding outside race diameter of said bearing assembly;

c) inserting said differential case into said differential carrier; and d) securing each of said bearing caps onto said differential carrier wherein each said bearing cap is forced against an outer race of said corresponding bearing assembly in a manner creating a preload and preventing rotation of said outer race of said bearing assembly.

2. The method for manufacturing a differential carrier as recited in claim 14, wherein said at least two semi-cylindrical bearing recesses in said differential carrier is machined simultaneously using a plunge mill.

3. The method for manufacturing a differential carrier as recited in claim 14, wherein said bearing caps are interchangeable for use on either side of said differential carrier.

4. The method for manufacturing a differential carrier as recited in claim 14, wherein said step of securing each of said bearing caps to said differential carrier is accomplished using at least two threaded fasteners.

5. The method of claim 1, wherein said step of machining at least two semi cylindrical recesses is performed independent from said bearing cap.

6. The method of claim 1, wherein said step of forging two bearing caps includes forming the bearing caps having a pair of longitudinally extending upstanding opposed sidewall members, and a web member extending therebetween.

7. The method of claim 1, wherein said step of forging two bearing caps includes fanning the bearing caps having an arcuate mid section terminating at each end to form a mating flange, wherein the mating flanges each having a retaining hole extending therethrough to receive mounting hardware.

8. The method of claim 6, wherein said step of forging two bearing caps includes forming the bearing caps having said mating flanges substantially the same thickness as said web member.

9. The method of claim 6, wherein said step of forging two bearing caps includes forming the bearing caps having said web member extending the length of said bearing cap and projecting laterally outward at longitudinally opposed ends.

* * * * *

UNITED STATES PATENT AND TRADEMARK OFFICE
CERTIFICATE OF CORRECTION

PATENT NO. : 6,595,085 B1  Page 1 of 1
DATED : July 22, 2003
INVENTOR(S) : Brent K. Osenbaugh It is certified that error appears in the above-identified patent and that said Letters Patent is hereby corrected as shown below:

Column 4,
Lines 36, 40 and 43, replace "recited in claim 14," with -- recited in claim 1, --.
Line 54, replace "fanning" with -- forming --.

Signed and Sealed this

Eleventh Day of November, 2003

JAMES E. ROGAN
*Director of the United States Patent and Trademark Office*